United States Patent [19]

Dipoala

[11] Patent Number: 5,093,656
[45] Date of Patent: Mar. 3, 1992

[54] ACTIVE SUPERVISION OF MOTION-DETECTION SYSTEMS

[76] Inventor: William S. Dipoala, 697 Turk Hill Rd., Fairport, N.Y. 14450

[21] Appl. No.: 492,482

[22] Filed: Mar. 12, 1990

[51] Int. Cl.$^5$ .................. G08B 13/18; G08B 13/24
[52] U.S. Cl. .................. 340/522; 340/515; 340/516; 340/554; 340/567
[58] Field of Search .......... 340/522, 516, 515, 554, 340/567

[56] References Cited

U.S. PATENT DOCUMENTS

| | | | |
|---|---|---|---|
| 3,383,678 | 5/1968 | Palmer | 340/554 |
| 3,928,849 | 12/1975 | Schwarz | 340/515 |
| 4,625,199 | 11/1986 | Pantus | 340/522 |
| 4,660,024 | 4/1987 | McMaster | 340/522 |
| 4,833,450 | 5/1989 | Buccola et al. | 340/522 |

*Primary Examiner*—Glen R. Swann, III

[57] ABSTRACT

A microwave motion-detection system incorporates apparatus for actively supervising the operability of the entire microwave system, from the transceiver component, through the output of its signal processing circuitry. Such supervision apparatus comprises a target simulator which responds to a time-varying electrical signal to cause the transceiver to respond as it does when detecting the type of change in reflected microwave energy normally caused by a target of interest moving in the region under surveillance. Preferably, such target simulator comprises a low-cost, general purpose diode positioned in close proximity to the receiver element of the transceiver, a low-frequency signal generator, and timing and control apparatus for periodically applying the output of the signal generator to such diode. In the event of a failure of any microwave system component during the target simulation operation, the supervision apparatus provides a "trouble" alarm. When the microwave system comprises one of the two components of a "dual-technology" motion-detection system, the timing and control apparatus assures a predetermined "quiet time" preceeding each target simulation operation. Such "quiet time" verifies that the microwave motion-detecting component is not continuously "in alarm", as may be caused, e.g., by a noisy receiver diode.

9 Claims, 2 Drawing Sheets

ACTIVE SUPERVISION OF MOTION-DETECTION SYSTEMS

BACKGROUND OF THE INVENTION

The present invention relates to improvements in systems of the type commonly used to detect the movement of objects (e.g. intruders, pedestrians, vehicles, etc.) in a region under surveillance. More particularly, it relates to improvements in apparatus for supervising the operating status of such systems to assure that, in the event of a system failure, notice can be given to the system operator at the earliest possible time.

For many years now, microwave systems have been used to detect moving objects within a spatial region of interest. Operating on the well-known Doppler principle, such systems function to transmit microwave energy (e.g. X-Band radiation of about 10.5 GHz.) into a region under surveillance and to detect changes in frequency of the reflected energy, as produced by the Doppler effect. In conventional heterodyne microwave systems, separate and specially constructed diodes are respectively used to radiate and detect microwave energy. The radiating diode, usually a so-called Gunn diode, is disposed in a resonant cavity and responds to an applied DC voltage to produce microwave energy. An antenna, operatively coupled to the resonant cavity, serves to direct this microwave energy into the region of interest and to receive such energy upon being reflected by objects therein. The detecting diode, known as the receiver or mixing diode, functions to mix the transmitted and received energy to detect frequency shifts (i.e. the Doppler frequency) between the transmitted and received energy, such frequency shifts being characteristic of the particular type of target motion. The output of the receiver diode is amplified and processed, in a conventional manner, to eliminate spurious noise and false alarm-producing sources. The filtered signal may be used for any purpose, for example, to activate an alarm and/or to notify the police in an intruder detection application, or to open a door or change a pedestrian signal light in a pedestrian-detection application.

While microwave systems have enjoyed considerable commercial success in a variety of industries for detecting the presence of moving objects, continuous care must taken to assure that such systems are operating effectively at all times. For example, it is well known that the transmitter and receiver diodes of such systems are exceptionally susceptible to damage by relatively low-level electrostatic discharge (ESD), such as occurs during routine handling of such components during manufacture, installation and maintenance. Such ESD often causes a catastrophic failure of these diodes, in which case the diode either shorts-out or opens-up. Such a damaged diode is sometimes referred to as a "zapped" diode and, whether shorted-out or opened-up, the diode is rendered useless. A less severe discharge can produce a so-called "zinged" or "injured" diode, in which case the diode may still operate, but in a very noisy condition which has the effect of either substantially reducing the detection range or producing a continuous alarm condition (in an intruder detection application). Also, environmental changes, e.g., temperature changes, can cause the transmitter diode to either operate in a noisy condition or to stop oscillating all together, without any damage whatsoever to such diode.

Since microwave energy is invisible, a transmission failure, as occasioned, for example, by a zapped Gunn diode, cannot be detected by mere observation. The same is true, of course, of a failure in the signal processing circuitry of such systems, as may be produced by a failure of some other circuit element. While a non-operating (i.e. failed) microwave system is quickly discernible in applications where the system output is used on a frequent basis, e.g., to open doors, change pedestrian traffic lights, etc., the same is not true in intruder detection applications where the system is often required to operate, with high reliability, for long periods of time, sometimes weeks or months, without any visible or audible signs that the system is functional. Thus, to minimize the possibility that a failed microwave component will go undetected for such long time intervals, conventional microwave intruder detection systems commonly incorporate a so-called "supervisory" circuit which operates to continuously monitor the operating status of the transmitter and receiver elements of such systems and to activate a "trouble" alarm in the event of a failure of either of these elements. Such a "trouble" alarm commonly takes the form of a readily observable light-emitting diode or the like mounted on the microwave transceiver housing. Also, in the security business to provide increased protection against false alarms, it is becoming more common to back-up or supplement microwave systems with another intruder-detection scheme, such as passive-infrared or ultrasonic. In such "dual technology" systems, an "intruder" alarm is normally produced only in the event both detection schemes detect motion at substantially the same instant. See, for example, the microwave/passive-infrared system disclosed in the commonly assigned U.S. Pat. No. 4,660,024, to R. L. McMaster.

The above-noted McMaster patent discloses a heterodyne microwave system which includes supervisory circuitry for detecting either transmitter or receiver failure. In this system, the receiver diode is positioned directly within the energy field of a Gunn diode. In addition to providing a reference signal for subsequent Doppler frequency detection, the energy received directly from the Gunn diode serves to bias the receiver "on," thereby demonstrating to the supervisory circuit, which monitors the voltage level across the receiver diode, that the Gunn diode is indeed transmitting energy, and that the receiver diode is indeed receiving such energy. While this supervisory scheme is capable of detecting a catastrophic failure of either transmitter or receiver components, it does not function to supervise the operating status of the signal processing circuitry which operates on the output of the receiver diode. Moreover, it cannot detect a constant alarm condition, as can be produced by a "zinged" or noisy receiver diode.

In the commonly assigned U.S. application Ser. No. 479,050, entitled SUPERVISION OF AUTODYNE MICROWAVE MOTION-DETECTION SYSTEM, filed in the names of W. S. Dipoala and D. F. Pedtke on Feb. 12, 1990, there is disclosed an autodyne microwave motion-detection system in which a low-cost, general purpose diode is positioned in the resonant cavity of the microwave energy-generator to continuously supervise the operating status of such generator. In the event the energy induced on the supervisory diode drops below a predetermined threshold level, a trouble alarm is produced, indicating a transmission failure. Here again, there is no supervision of the system as a whole; rather, only the transmitting element is supervised. Also, like the McMaster supervisory scheme, no provision is made to detect a noisy transmitter diode or failure of the signal processing circuit.

In U.S. Pat. No. 4,833,450 to C. Buccola et al., there is disclosed a microwave/passive-infrared (i.e. dualtech) intrusion detection system which incorporates a supervision circuit for detecting the operating status of the two detecting components. Such supervision circuit operates by counting the number of "false" trips of each component, i.e., a trip of one component not accompanied by a simultaneous trip by the other. When the number of false trips exceeds a certain preset value, a supervisory alarm is given, indicating that one or the other detecting components is faulty. While this supervisory scheme may have certain advantages, it is disadvantageous in that it is totally "passive" in nature. That is, to work, it must rely on the movement of an object or the occurrence of some event in the region of interest to produce the requisite false tripping of the alarm relays. Usually, such false trips will occur and be counted during periods in which the system is inactivated to allow authorized use of the protected premises. Should there be no opportunity for such events to occur, or should the events occur infrequently, as in the case, for example, where the protected region is a normally unoccupied warehouse, this supervision scheme would not work.

SUMMARY OF THE INVENTION

In view of the foregoing discussion, an object of this invention is to improve the reliability of microwave motion-detection systems by providing an apparatus for actively supervising the operating status of such systems.

Another object of this invention is to provide a target-simulating apparatus for producing substantially the same effect in a microwave system's resonant cavity as that produced by an intended target moving in a region under surveillance.

Still another object of this invention is to provide apparatus for supervising the output of an alarm-producing circuit in a microwave system to detect the presence of a constant alarm condition, as may be produced by a noisy transmitter or receiver diode.

A further object of this invention is to provide a totally and actively supervised dual-technology intrusion-detection system.

According to a preferred embodiment of the invention, there is provided an actively supervised Dopplertype motion-detecting system comprising a microwave transceiver for transmitting microwave energy into a region under surveillance and for receiving such microwave energy upon being reflected by targets within such region. The transceiver comprises a resonant cavity, a microwave energy-producing element disposed in such cavity, and an antenna for directing microwave energy from the cavity toward the region of interest and for concentrating such microwave energy, upon being reflected by targets in the region, to a location within said cavity. A Doppler frequency detector comprising a microwave energy sensor disposed in the cavity functions to detect any change in frequency between the transmitted and received microwave energy, as produced by the Doppler effect. The microwave system of the invention is characterized by a target-simulator, preferably arranged within the resonant cavity, for simulating the movement of targets in the region of interest. According to a preferred embodiment, such target-simulator comprises a general purpose diode and a signal-generator, operatively coupled to such diode, for producing a time-varying, low frequency voltage across the diode which causes the Doppler frequency detector to respond as though a target of interest had reflected microwave energy back to the resonant cavity. Preferably, the signal-generator is periodically activated, e.g., about once every hour, for a short time period, e.g., a few seconds, during which period the primary system alarm is inhibited to allow the simulated target to be detected, and the operational status of the system verified. Such system may be used either as a "stand-alone" system, or it may be combined with another technology for detecting an event of interest (e.g. intrusion) in a dual-technology system of the afore-mentioned type. When so combined, apparatus is provided for periodically supervising both detection technologies substantially simultaneously.

According to another aspect of the invention, timing and control means are provided for assuring a predetermined "quiet time" preceeding each use of the targetsimulator, thereby assuring that the system is not in the process of detecting an authenic target at the time of target simulation. Such timing and control means comprises a programmed microprocessor which functions to establish two predetermined time intervals, a "quiet time" interval, e.g., 10 seconds, and a long time interval, e.g., 24 hours. Before target simulation, the timing and control circuit verifies that the microwave system has been "quiet", i.e., has not been "in alarm", for the preceding 10 seconds. If it has been in alarm, it continues to monitor the "in alarm" condition for the long time interval. If the "in alarm" condition persists for a period exceeding the long time interval, as it may, for example, in the case of a "zinged" receiver diode, a trouble alarm is provided.

The invention and its various advantages will become more apparent to those skilled in the art from the ensuing detailed description of preferred embodiments, reference being made to the accompanying drawings.

DETAILED DESCRIPTION OF PREFERRED EMBODIMENTS

Figure 1:
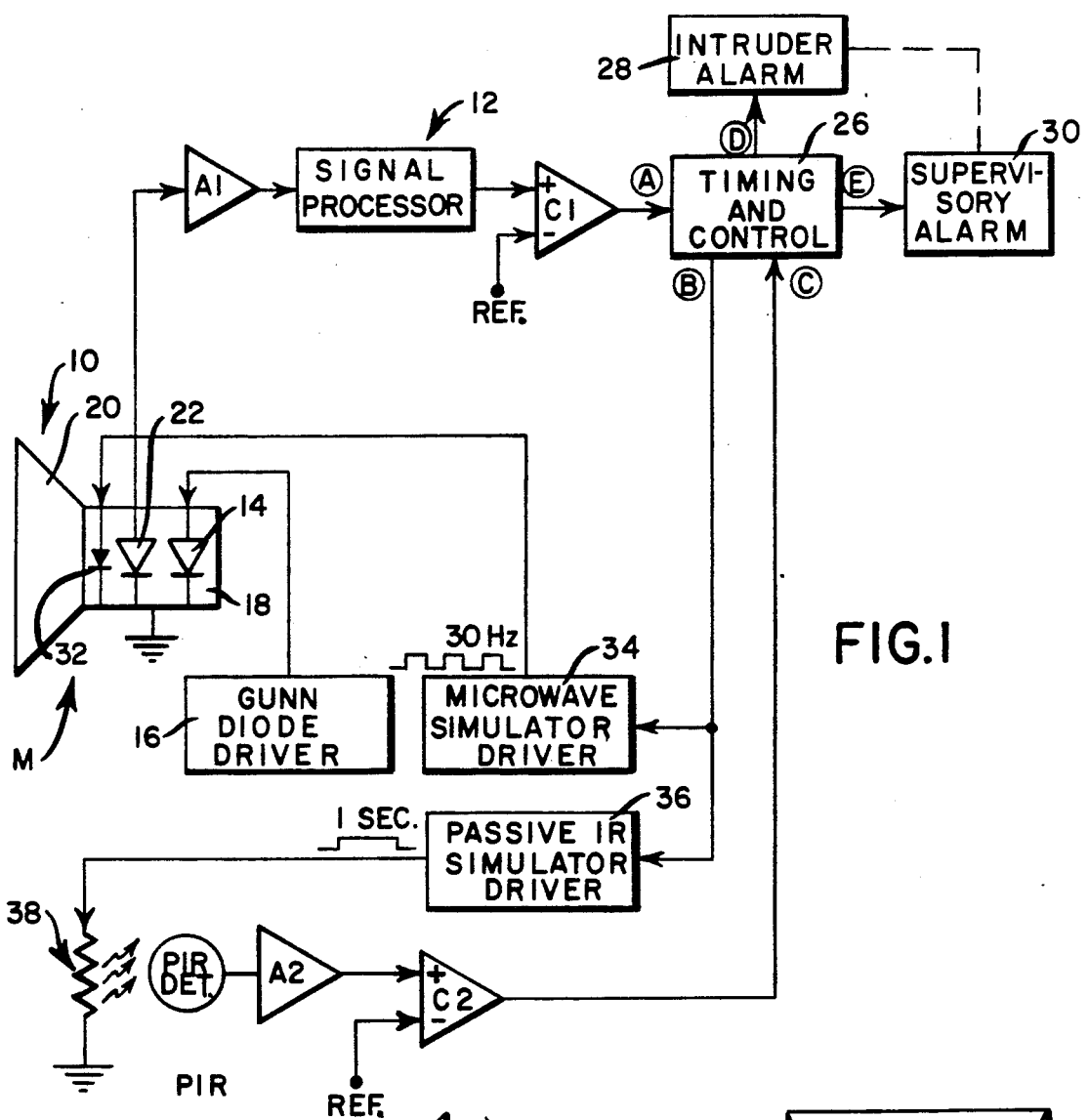
FIG. 1 is a block diagram schematically illustrating a dual-technology intruder detection system comprising a microwave motion-detection system embodying a preferred form of the invention.
Figure 3B:
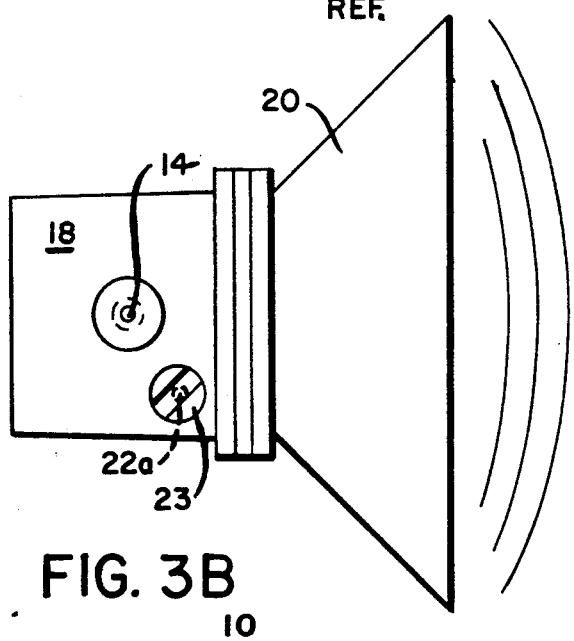
FIGS. 3A and 3B are front and side elevations of the antenna and resonant cavity components of a microwave transceiver showing a portion of a preferred target-simulator comprising the supervision apparatus of the invention.
Figure 3A:
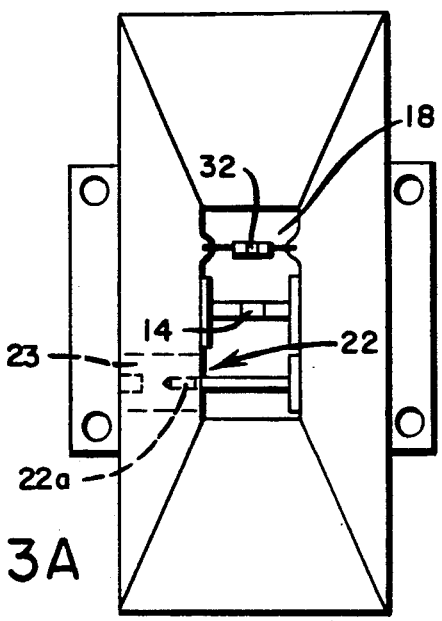

Referring now to the drawings, FIG. 1 schematically illustrates a so-called "dual-technology" intruder detection system comprising a microwave component M and a passive-infrared component PIR. The microwave component is of the Doppler type, functioning to detect an intruder by the change in frequency his motion produces in a fixed frequency microwave carrier. Component M comprise a transceiver element 10 for transmitting and receiving microwave energy, and signal processing circuitry 12 for processing the output of the transceiver to detect an intruder-produced frequency shift (i.e., the Doppler frequency) and to discriminate against certain false alarm-producing sources. The transceiver is of the heterodyne type, comprising discrete microwave transmitter and receiver elements. The microwave transitter includes a Gunn diode 14 or the like and a driver circuit 16 therefor. The latter may be either pulsed or continuous-wave and serves to apply a suitable voltage to the Gunn diode to cause it to produce microwave energy. The Gunn diode is arranged in a resonant cavity 18 which is tuned for a desired microwave frequency, typically 10.5 GHz. An antenna 20, best shown in FIGS. 3A and 3B, serves to direct the microwave energy produced in the cavity toward a region under surveillance. The same antenna also functions to focus microwave energy reflected by targets or objects within the region of interest into the resonant cavity. The receiver element of transceiver 10 comprises a receiver or "mixer" diode 22 which is also arranged within, or in very close proximity to, cavity 18. In FIG. 3A, the active portion 22A of the receiver diode is shown positioned just outside the cavity wall, being held in place by a screw 23 threaded into the cavity-defining housing. Such an arrangement is conventional and commercial. The receiver diode develops a time-varying voltage which is amplitude-modulated at the Doppler frequency. Upon being amplified by amplifier A1 and filtered by signal processing circuit 12, the voltage developed across the receiver diode is threshold detected by a comparator C1. The comparator output A is fed to a timing and control circuit 26 which, as explained below, activates either of two alarms, an intruder alarm 28, or a supervisory or "trouble" alarm 30.

The PIR component of the intruder detection system detects intrusion by sensing the body heat of an intruder. Such component comprises a pyroelectric detector 30 which is positioned at the focal point of an optical system (not shown) having one or more a fields of view within the region under surveillance. The output of detector 30 is amplified by amplifier A2 and threshold detected by comparator C2. The output of comparator C2 is fed to timing and control circuit 26 which activates the intruder alarm in the event both PIR and microwave components detect intrusion at substantially the same instant in time. Such an arrangement, of course, is intended to enhance the reliability of the system by rendering the system insensitive to false-alarm sources which affect only one of the detection components.

According to one aspect of this invention, both the microwave and PIR components of the dual-technology intruder-detection system described above, are fully and actively supervised to alert the user of a faulty circuit element anywhere in the detection system, from the transmitting element (in the microwave component) and the sensor element (in the PIR component), through the alarm-activating circuit common to both components. According to another aspect of this invention, a "stand alone" microwave motion-detection system is actively supervised by the incorporation of a target-simulator which, on command, causes the receiver to respond in the same manner as it does when the motion of interest is occurring in the region under surveillance.

Active supervision of the microwave component of the FIG. 1 system is provided by a target-simulator arranged within, or in close proximity to, resonant cavity 18. Such target-simulator preferably comprises a low-cost, general purpose diode 32 and a driver circuit 34 therefor. A particularly preferred diode is a Type 1N4454 switching diode, such as manufactured by Rohm Corp. and selling for about one-tenth of a cent. As shown in FIG. 3A, diode 32 is positioned in the throat of antenna 20, at the forward end of cavity 18. It is located within one of the energy lobes of the Gunn diode. In response to an enable signal B produced on one of the outputs of the timing and control circuit, driver 34 applies a 30 Hz. signal to the target simulating diode. This has the effect of varying, at 30 Hz., the impedance of diode 32 to microwave energy, causing the voltage across the receiver diode 22 to be amplitude-modulated in the same way as it is by intruder-reflected energy which is shifted in frequency by the Doppler effect. Thus, when driver circuit 34 applies its time-varying signal to diode 32, signal processing circuit 12 responds as if a target had moved in the region under surveillance, and an alarm-activating signal A will be produced by comparator C1. Note, in order for the signal processing circuitry to so respond, the transmitter must be transmitting microwave energy, the receiver must be operating to, in effect, mix the transmitted energy with the simulation signal, and the signal processing circuit must be operative to process the receiver diode output in the same manner as it processes an authenic Doppler signal. Thus, it will be appreciated that the entire system is actively supervised at very low cost. The current applied to diode 32 is of the order of a few milliamperes and is adjustable, such as by a potentiometer or the like. By calibrating the current applied to diode 32, it is possible to detect a reduction in detection range or system sensitivity, in addition to total loss of protection.

Since the target-simulation circuit cannot be operated on a continuous basis (lest it interfere with target detection), timing and control circuit 26 functions to apply the driver-enabling signal B for a short time interval, say, a few seconds every hour or so. Such enable signal is also applied to a driver circuit 36 which forms part of a supervision circuit of the PIR component. The output of circuit 36 is a one second current pulse which is applied to a small heater element 38 which functions to irradiate the PIR detector and produce a readily detectible signal therefrom, a signal sufficiently large as to produce an alarm-activating signal C on the output of comparator C2.

Figure 2:
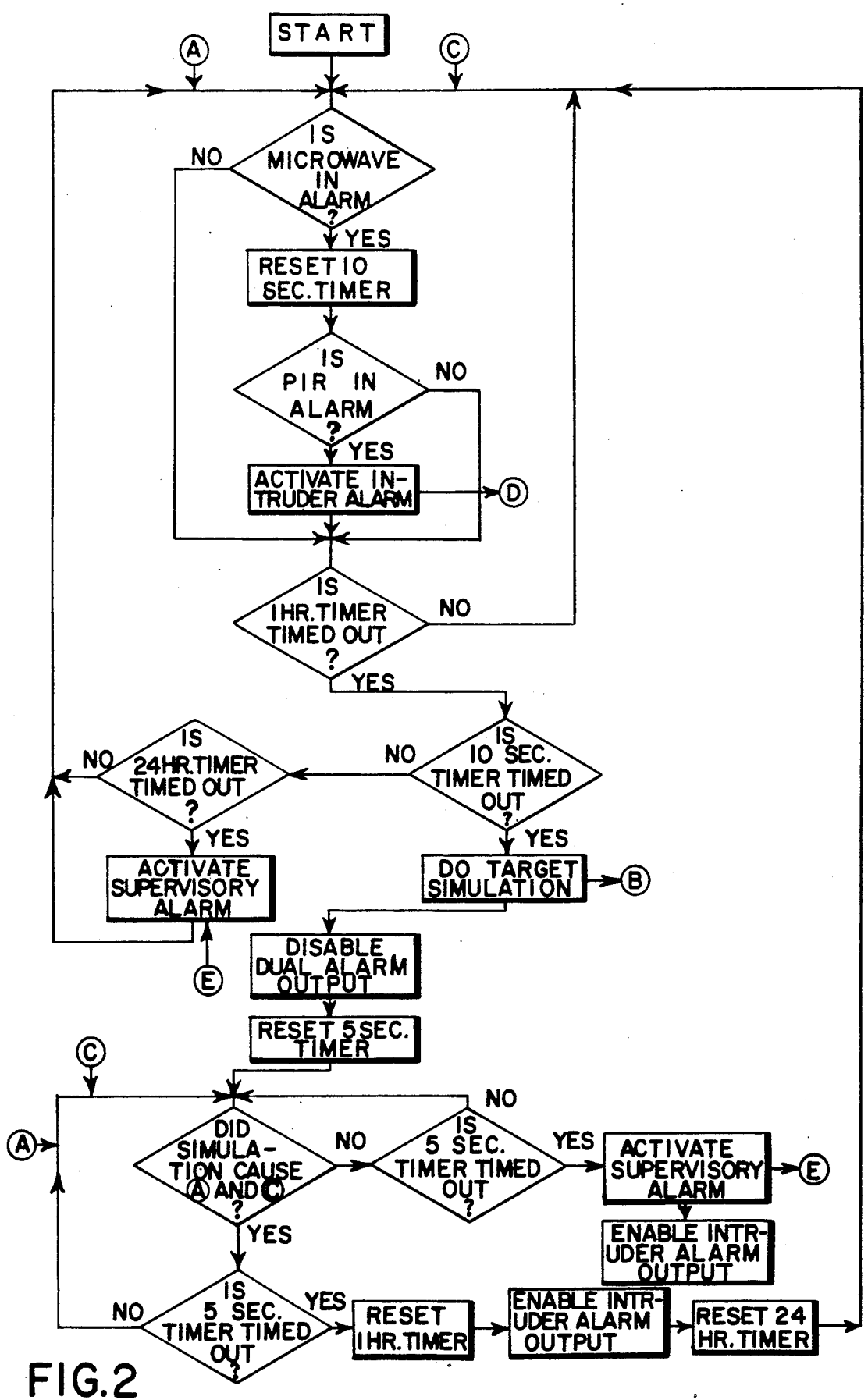
FIG. 2 is a flow chart illustrating the functional operation of the timing and control circuit shown in FIG. 1.

Timing and control circuit 26 includes a suitably programmed microprocessor (e.g. a National Semiconductor Model COP-840 microcontroller) which carries out the program represented in the flow-chart of FIG. 2. As explained below, the microprocessor establishes four different timing intervals or "clocks" which cooperate to supervise the entire dual-tech system. First, prior to initiating target simulation, the microprocessor assures that the system is not already in the process of detecting intrusion. To provide this assurance, the microprocessor establishes a "quiet" time interval of, in this case, 10 seconds immediately preceding target simulation. During this period, circuit 26 determines whether an alarm-activating signal is being provided by either detection components on inputs A and C. Note, in the event the receiver diode has been "zinged", its output may be so noisy that the there will be a continuous output A from comparator C1, or a nearly continuous output, as in the case where the comparator input is rapidly varying about the comparator's reference level. As indicated in FIG. 2, the microprocessor first asks, "Is the microwave component in alarm?" If the answer is YES, the microprocessor resets a 10 second timer and asks, "Is the PIR component in alarm?" If again the answer is YES, the intruder alarm 28 is activated. This sequence is common to virtually all dual-tech systems. If, on the other hand, the answer to either question is NO, the microprocessor asks, "Is the 1 hour timer timed out?" Note, this is the 1 hour timer that controls the frequency at which the target simulation tests are conducted. If a target simulation has been conducted within the preceding hour, the answer is NO, and the three question loop is repeated until the answer to the last question is YES.

Not having done a target simulation for the preceding hour, the question is asked, "Is the 10 second timer timed out?" If the answer is YES, indicating that neither alarm producing signals A or C has been produce before the 10 second timer timed out, the target simulation sequence can commence, such sequence being described below. If, however, the answer is NO, indicating that either one or the other alarm-producing signals A or C has been produced before the ten second timer could time out, the question is asked, "Is the 24 hour timer timed out?" Note, such 24 hour time interval is the period that an "In Alarm" condition will be allowed to persist before a "Trouble" or supervisory alarm will be produced. If the 24 hour timer has not timed out, the four question loop will be repeated for 24 hours, i.e., until the 24 hour timer has timed out. Thereupon, the "Trouble" alarm will be given, indicating to the system user that on of the detection components is constantly "in alarm" and must be serviced.

Now, assuming that the 10 second "quiet time" has been assured, the system is now ready for the target simulation sequence. Upon receiving notice that the 10 second timer has timed out, the circuit 26 provides an output B which, as indicated above, enables both microwave and PIR simulator drivers, 34 and 36, respectively. At the same time, the intruder alarm output D is disabled, so as not to produce an alarm in response to the target simulation tests, and a 5 second timer is reset. Thereafter, the question is asked, "Did the target simulations produce the alarm-producing signals A and C?" If the answer is NO, this question is repeated for 5 seconds. If the answer is still No after the 5 second timer has timed out, the "Trouble" alarm is activated, indicating that one or both detection components has failed the target simulation test. Also, the intruder alarm is enabled again so that protection will be afforded by the remaining (i.e., still functioning) detection component, if there is one. (Note, such a "default" scheme is disclosed in the aforementioned McMaster patent.) If the target simulation produces both signals A and C, and the 5 second timer has timed out, the 1 hour and 24 hour timers are reset, and the "Intruder" alarm is again enabled.

From the foregoing, it will be appreciated that a fully supervised dual technology intruder detection system has been provided. The specified time intervals are only exemplary of those that can be used. Also, though the system is described as being supervised hourly, it may be preferred that the microprocessor be programmed to simulate targets at different time intervals, approximately 1 hour long. For example, the microprocessor could establish repeating time intervals of 55, 65, 58 and 62 minutes. In this manner, the target simulation is less predictable by one who is inclined to defeat the system. Also, as mentioned above, the target simulator of the microwave component is believed to be unique in itself, and is described in a dual-tech system only to abbreviate this description. Clearly, the target simulation apparatus of the microwave component described above can be used in a stand-alone microwave system.

While the active supervision scheme of the invention has been described in a heterodyne microwave system, it will be appreciated that it has equal utility in an autodyne system where the transmitter (Gunn) diode also functions as the detector. Also, it is not required that the microwave transmitter and receiver share the same antenna or, for that matter, the same housing. Also, while the dual-technology detection system disclosed above is of the microwave/passive-infrared type, other conventional non-microwave detection systems (e.g., ultrasonic, photoelectric, etc.) can be combined with the microwave component. Many other modifications can be made, of course, without departing from the spirit of the invention, and the scope of the invention is defined only by the following claims.

What is claimed is:

1. A microwave motion-detection system for detecting the motion of targets in a region under surveillance, said system comprising:
   (a) transceiver means for transmitting microwave energy into such region and for receiving such microwave energy upon being reflected by targets within such region, said transceiver means comprising a resonant cavity, a microwave energy-producing element disposed in said cavity, an antenna for directing microwave energy from said cavity toward said region and for concentrating such microwave energy, upon being reflected by targets in said region, to a location within said cavity, and detecting means disposed in said cavity for detecting microwave energy reflected back to said cavity by such targets, said energy-producing element being responsive to an applied electrical signal to produce such microwave energy,
   (b) circuit means for detecting any change in frequence between the transmitted and received microwave energy as produced by a target moving within such region and for providing an output signal in response to detecting a predetermined frequency change; and
   (c) target-simulating means for simulating the movement of targets in such region, said target-simulating means comprising a general purpose diode arranged to be irradiated by microwave energy produced by said microwave energy-producing element, and signal-generating means for producing a time-varying voltage across said diode, whereby the impedance of said diode to microwave energy is caused to change according to the applied signal, causing the circuit means to respond as though a target had moved within such region.

2. The apparatus as defined by claim 1 wherein said target-simulating means further comprises timing and control means for establishing a first time interval, and for applying said time-varying voltage to said diode for a predetermined time period at a certain time with respect to said first time interval.

3. The apparatus as defined by claim 2 wherein said timing and control means comprises means for establishing a second time interval when said voltage is applied to said diode, means for determining whether said circuit means produces an output signal within said second time interval, and means for providing a supervisory signal in the event said output is not provided within said second time interval.

4. A dual-technology intruder detection system for detecting the presence of an intruder in a region under surveillance, said system comprising:
    (a) a microwave component for detecting intruders by transmitting microwave energy into such region and detecting, from the energy reflected from intruders moving within such region, the presence of such intruders;
    (b) a passive-infrared component for detecting intruders by monitoring such region for relatively abrupt changes in temperature as produced by intruders moving within such region; and
    (c) intruder-simulating means for selectively causing both said microwave and passive-infrared components to respond, within a predetermined time interval, as though an intruder were moving in such region;
    said microwave component comprising: transmitter means for transmitting microwave energy of predetermined frequency into such region; and receiver means for detecting changes in frequency of such microwave energy upon being reflected by objects moving within such region; and said intruder-simulating means comprising a general purpose diode positioned in close proximity to said receiver means to be irradiated by microwave energy transmitted by said transmitting means, and circuit means for selectively applying a low frequency signal to said diode, thereby causing said receiver means to respond as though it had detected a change in frequency of such reflected energy.

5. The apparatus as defined by claim 4 wherein said intruder-simulating means further comprises timing and control means for establishing a first time interval, and for applying said time-varying voltage to said diode for a predetermined time period at a certain time with respect to said first time interval.

6. The apparatus as defined by claim 5 wherein said timing and control means comprises means for establishing a second time interval when said voltage is applied to said diode, means for determining whether said circuit means produces an output signal within said second time interval, and means for providing a supervisory signal in the event said output is not provided within said second time interval.

7. A dual-technology intruder detection system for detecting the presence of an intruder in a region under surveillance, said system comprising:
    (a) a microwave component for detecting intruders by transmitting microwave energy into such region and detecting, from the energy reflected from intruders moving within such region, the presence of such intruders, said microwave component providing an alarm signal in response to detecting intrusion;
    (b) a non-microwave component for detecting intruders by monitoring such region for other changes in ambient conditions caused by the presence of intruders within such region; and
    (c) intruder-simulating means for selectively causing both said microwave and non-microwave components to respond as though an intruder were moving in such region;
    said microwave component comprising: transmitter means for transmitting microwave energy of predetermined frequency into such region; and receiver means for detecting changes in frequency of such microwave energy upon being reflected by objects moving within such region; and said intruder-simulating means comprising a general purpose diode positioned in close proximity to said receiver means to be irradiated by microwave energy transmitted by said transmitting means, and circuit means for selectively applying a low frequency signal to said diode, thereby causing said receiver means to respond as though it had detected a change in frequency of such reflected energy.

8. The apparatus as defined by claim 7 wherein said intruder-simulating means further comprises timing and control means for determining whether either of said components has detected an intruder within a predetermined time interval preceeding the application of said low frequency signal to said diode.

9. The apparatus as defined by claim 8 wherein said timing and control circuit comprises means for providing an alarm indication in the event the microwave component is substantially continuously providing said alarm signal for an extended period of time.

* * * * *